United States Patent
Fukuta

(10) Patent No.: US 9,706,467 B2
(45) Date of Patent: Jul. 11, 2017

(54) COMMUNICATION CONTROL METHOD, BASE STATION, AND USER TERMINAL

(71) Applicant: KYOCERA CORPORATION, Kyoto (JP)

(72) Inventor: Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 568 days.

(21) Appl. No.: 14/355,067

(22) PCT Filed: Nov. 2, 2012

(86) PCT No.: PCT/JP2012/078523
§ 371 (c)(1),
(2) Date: Apr. 29, 2014

(87) PCT Pub. No.: WO2013/065842
PCT Pub. Date: May 10, 2013

(65) Prior Publication Data
US 2014/0301372 A1    Oct. 9, 2014

Related U.S. Application Data

(60) Provisional application No. 61/555,259, filed on Nov. 3, 2011.

(51) Int. Cl.
*H04W 36/30* (2009.01)
*H04W 16/32* (2009.01)
(Continued)

(52) U.S. Cl.
CPC .......... *H04W 36/30* (2013.01); *H04W 16/32* (2013.01); *H04W 36/20* (2013.01); *H04W 36/06* (2013.01); *H04W 36/32* (2013.01)

(58) Field of Classification Search
CPC ..... H04W 4/021; H04W 4/023; H04W 4/025; H04W 40/20; H04W 48/04;
(Continued)

(56) References Cited

U.S. PATENT DOCUMENTS 8,588,790 B2 * 11/2013 Cho ................. H04W 36/0055
                                                                455/441
9,144,010 B2 *  9/2015 Cai ..................... H04W 48/16
(Continued)

FOREIGN PATENT DOCUMENTS

JP    2009-260448 A    11/2009

OTHER PUBLICATIONS

The extended European search report issued by the European Patent Office on Oct. 22, 2015, which corresponds to European Patent Application No. 12844859.4-1857 and is related to U.S. Appl. No. 14/355,067.

(Continued)

*Primary Examiner* — Robert M Morlan
(74) *Attorney, Agent, or Firm* — Studebaker & Brackett PC

(57) ABSTRACT

A communication control method in a mobile communication system including a first base station and at least one second base station having a smaller coverage area than the first base station, comprises: a step A of transmitting location information indicating a location of the second base station from the first base station; and a step B of transmitting proximity notification information to the first base station from a user terminal connected to the first base station after the user terminal receives the location information, the proximity notification information indicating that the user terminal is in proximity of the second base station and being used for making the user terminal use a different carrier from a carrier used by the second base station.

11 Claims, 10 Drawing Sheets

(51) Int. Cl.
*H04W 36/20* (2009.01)
*H04W 36/32* (2009.01)
*H04W 36/06* (2009.01)

(58) Field of Classification Search
CPC . H04W 52/244; H04W 64/00; H04W 64/003; H04W 72/044; H04W 72/0453; H04W 84/0105; H04W 84/105; H04W 84/045; H04W 84/047; H04L 5/008; H04L 5/0098
See application file for complete search history.

(56) References Cited

U.S. PATENT DOCUMENTS

| | | | |
|---|---|---|---|
| 2009/0264134 A1 | 10/2009 | Xu et al. | |
| 2011/0013600 A1* | 1/2011 | Kim | H04L 5/0085 370/332 |
| 2011/0028143 A1* | 2/2011 | Johansson | H04L 41/0893 455/422.1 |
| 2011/0105135 A1 | 5/2011 | Krishnamurthy et al. | |

OTHER PUBLICATIONS

Communication pursuant to Rules 70(2) and 70a(2) EPC issued by the European Patent Office on Nov. 10, 2015, which corresponds to European Patent Application No. 12844859.4-1857 and is related to U.S. Appl. No. 14/355,067.
Ericsson; "Analysis of Solutions for Mitigation of UL Interference in CB-ICIC"; 3GPP; TSG-RAN WG3 #75bis; R3-120727; Mar. 26-30, 2012; pp. 1-9; Cabo San Luca, Mexico.
International Search Report; PCT/JP2012/078523; Jan. 29, 2013.
3GPP TS 36.300 V10.4.0 (Jun. 2011); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10).

* cited by examiner

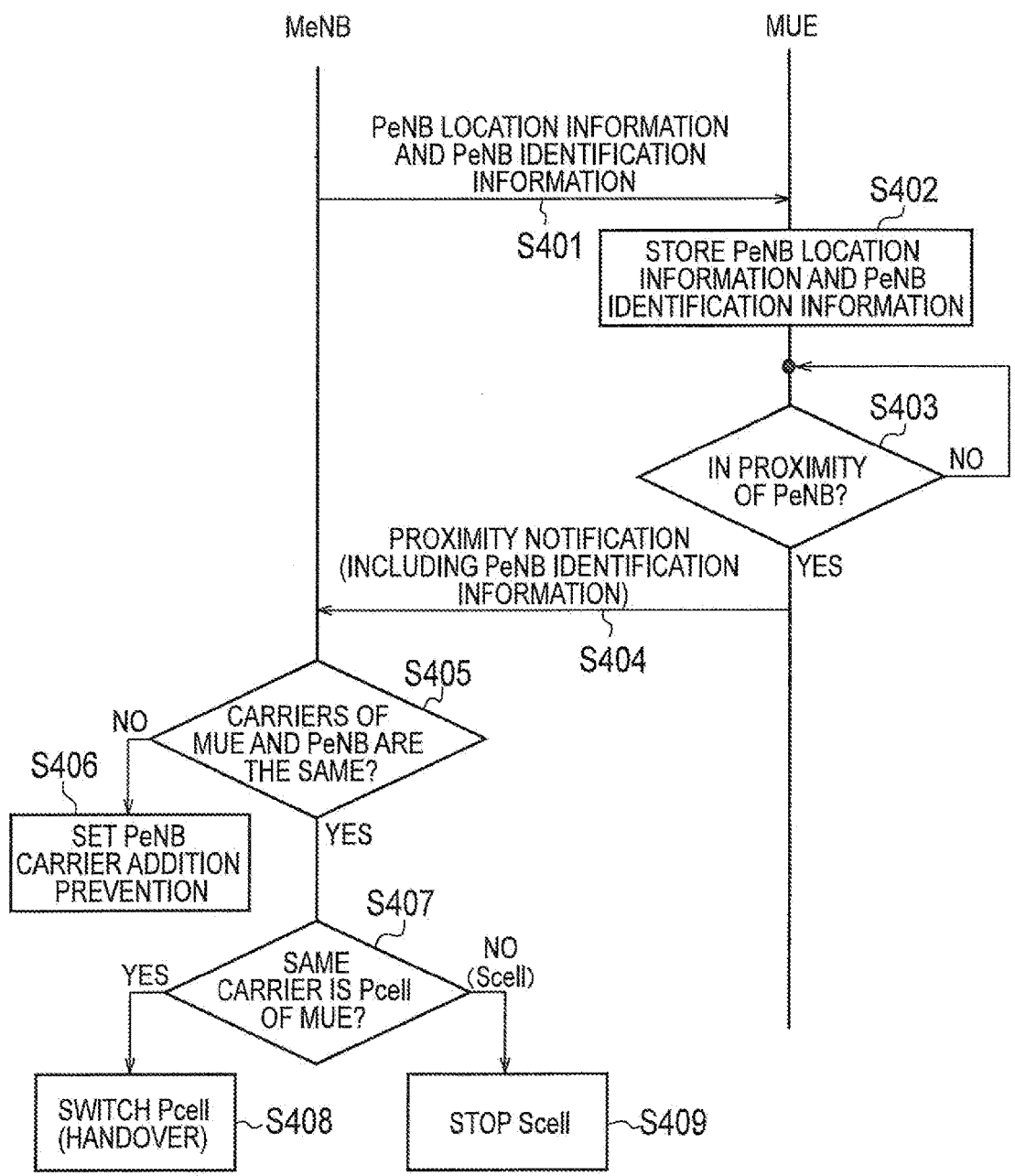

COMMUNICATION CONTROL METHOD, BASE STATION, AND USER TERMINAL

BACKGROUND OF THE DISCLOSURE

Technical Field

The present invention relates to a communication control method, a base station, and a user terminal in a mobile communication system.

Background Art

3GPP (3rd Generation Partnership Project) that is a standardization project of mobile communication systems is working on standardization of LTE Advanced that is an advanced version of LTE (Long Term Evolution) in 3GPP release-10 or later (see, for example, 3GPP TS 36.300 v10.4.0).

In LTE-Advanced, provision of a heterogeneous network is under study in which a low power base station (so-called pico base station and home base station) is installed in a coverage area of a high power base station (so-called macro base station). The heterogeneous network can distribute the load on the high power base station to the low power base station.

To achieve a wider band width while securing backward compatibility with LTE, a carrier aggregation technique is introduced in LTE Advanced. In the carrier aggregation technique, a carrier (frequency band) in LTE is regarded as a component carrier (CC), and multiple carriers are used in combination for radio communications. "Carrier" is treated as "cell" in some cases.

CITATION LIST

Non-Patent Documents

Non-Patent Documents 1: 3GPP TS 36.300 v10.4.0

SUMMARY OF INVENTION

In the heterogeneous network, when the high power base station and the low power base station use the same carrier and a user terminal connected to the high power base station is located around the boundary of the coverage area of the lower power base station, the low power base station might receive uplink interference from the user terminal.

If the user terminal as the interference source can be identified, such uplink interference may be prevented by causing the user terminal as the interference source (hereinafter referred to as "interfering user terminal") to perform handover to another carrier.

Unfortunately, the low power base station can recognize the uplink interference but cannot identify the interfering user terminal. The high power base station and the user terminal connected thereto cannot recognize that the user terminal is giving the uplink interference to the low power base station, and cannot identify the interfering user terminal.

Thus, it has been difficult to prevent the uplink interference in the heterogeneous network.

Therefore, the present invention provides a communication control method, a base station, and a user terminal that are capable of preventing uplink interference in a heterogeneous network.

A communication control method according to the present invention is a communication control method in a mobile communication system including a first base station (e.g. MeNB 100-1) and at least one second base station (e.g. PeNB 100-2) having a smaller coverage area than the first base station. The method comprises: a step A of transmitting location information indicating a location of the second base station from the first base station; and a step B of transmitting proximity notification information to the first base station from a user terminal (e.g. MUE 200-1) connected to the first base station after the user terminal receives the location information, the proximity notification information indicating that the user terminal is in proximity of the second base station and being used for making the user terminal use a different carrier from a carrier used by the second base station.

With another feature of the communication control method according to the present invention, in the step A, the first base station transmits the location information indicating the location of the second base station while associating the location information with the used carrier of the second base station.

With another feature of the communication control method according to the present invention, the step A comprises a step of broadcasting, on each used carrier of the first base station, information indicating the used carrier of each second base station.

With another feature of the communication control method according to the present invention, the step A comprises a step of broadcasting, on each used carrier of the first base station, location information indicating the location of the second base station using the same carrier as the used carrier.

With another feature of the communication control method according to the present invention, in the step A, when a secondary carrier is added to the user terminal, the first base station unicasts, to the user terminal, location information indicating the location of the second base station using the same carrier as the secondary carrier.

With another feature of the communication control method according to the present invention, in the step B, when the used carrier of the second base station in the proximity of the user terminal is the same as the used carrier of the user terminal, the user terminal transmits the proximity notification information including information indicating the same carrier is transmitted.

With another feature of the communication control method according to the present invention, the communication control method further comprises a step of, after the reception of the proximity notification information transmitted in the step B, performing handover control by the first base station such that the used carrier of the user terminal is switched to another carrier when the used carrier of the second base station in the proximity of the user terminal is the same as the used carrier of the user terminal.

With another feature of the communication control method according to the present invention, the communication control method further comprises a step of, after the reception of the proximity notification information transmitted in the step B, performing handover control by the first base station such that the primary carrier is switched to another carrier when the used carrier of the second base station in the proximity of the user terminal is the same as the primary carrier of the user terminal.

With another feature of the communication control method according to the present invention, the communication control method further comprises a step of, after the switching of the primary carrier to the another carrier, performing a setting by the first base station such that a carrier used as the primary carrier before the switching is prevented from being added as the secondary carrier of the user terminal.

With another feature of the communication control method according to the present invention, the communication control method further comprises a step of, after the reception of the proximity notification information transmitted in the step B, performing control by the first base station such that use of the secondary carrier is stopped when the used carrier of the second base station in the proximity of the user terminal is the same as the secondary carrier of the user terminal.

A base station according to the present invention is a base station in a mobile communication system. The base station comprises: a transmission unit configured to transmit location information indicating a location of another base station; and a reception unit configured to receive proximity notification information from a user terminal connected to the base station, the proximity notification information indicating that the user terminal is in proximity of the another base station and being used for making the user terminal use a different carrier from a carrier used by the another base station in the proximity of the user terminal.

A user terminal according to the present invention is a user terminal in a mobile communication system. The user terminal comprises: a reception unit configured to receive, from a first base station, location information indicating a location of a second base station; and a transmission unit configured to transmit proximity notification information to the first base station after the reception unit receives the location information, the proximity notification information indicating that the user terminal is in proximity of the second base station and being used for making the user terminal use a different carrier from a carrier used by the second base station in the proximity of the user terminal.

BRIEF DESCRIPTION OF THE DRAWINGS

FIG. 11 shows an operation pattern 2 of the communication system according to the fourth embodiment.

DESCRIPTION OF EMBODIMENTS

Figure 1:
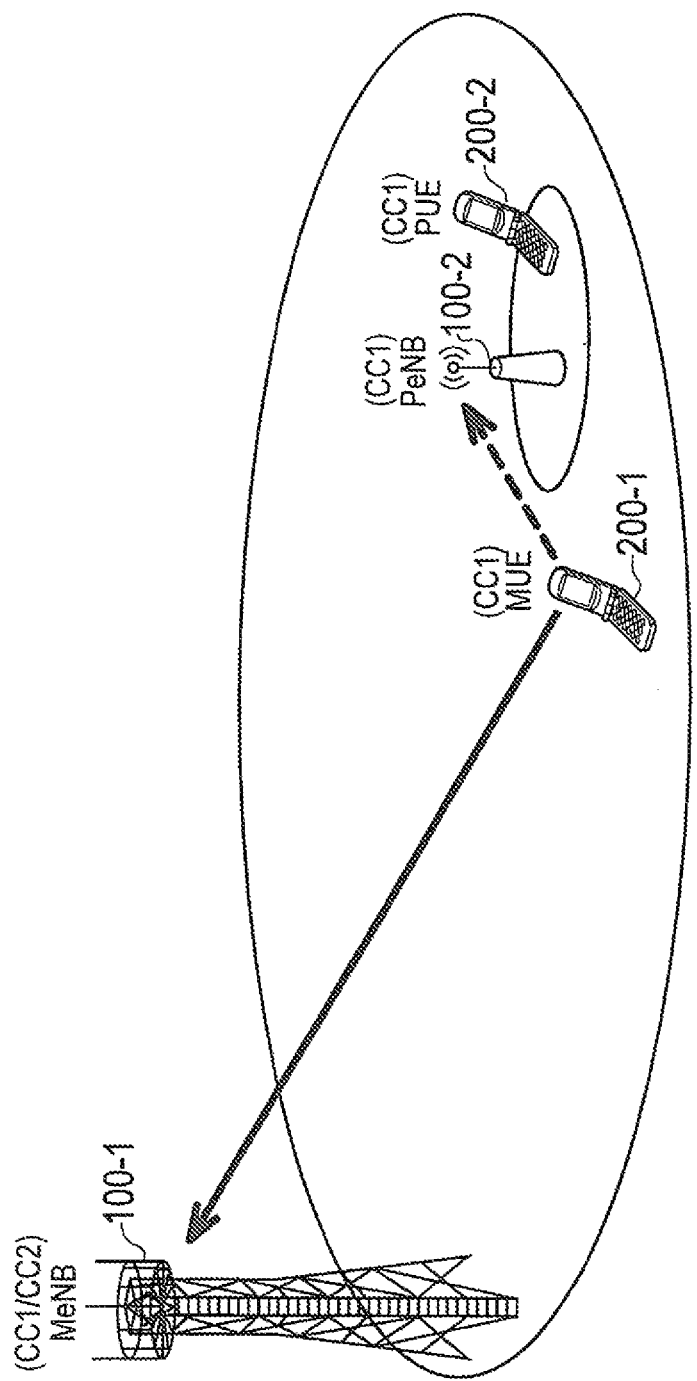
FIG. 1 shows a mobile communication system according to first to fourth embodiments.

Embodiments of the present invention are described with reference to the drawings. In the drawings related to the embodiments described below, the same or similar portions are denoted with the same or similar reference signs.

First Embodiment (Configuration of Mobile Communication System)

FIG. 1 shows a mobile communication system according to a first embodiment. The mobile communication system according to this embodiment is configured based on LTE Advanced (in 3GPP release-10 and after).

As shown in FIG. 1, the mobile communication system includes a macro base station (Macro evolved Node-B: MeNB) 100-1 configured to form a large coverage area and a pico base station (Pico evolved Node-B: PeNB) 100-2 configured to form a small coverage area. In FIG. 1, only one PeNB 100-2 installed in the coverage area of the MeNB 100-1 is illustrated. Alternatively, a plurality of PeNBs 100-2 may be installed in the coverage of the MeNB 100-1. One or a plurality of user terminals (User Equipment: UE) are connected to each of the MeNB 100-1 and the PeNB 100-2.

Hereinafter, the UE connected to the MeNB 100-1 is referred to as an MUE 200-1, and the UE connected to the PeNB 100-2 is referred to as a PUE 200-2. When the MeNB 100-1 and the PeNB 100-2 are not particularly distinguished from each other, they are simply referred to as an eNB 100. When the MUE 200-1 and the PUE 200-2 are not particularly distinguished from each other, they are simply referred to as a UE 200.

Connected is a state where the UE 200 is synchronized with the eNB 100, and is a state where a radio resource can be allocated from the eNB 100 to the UE 200. Uplink is a communication direction from the UE 200 to the eNB 100, and downlink is a communication direction from the eNB 100 to the UE 200.

The MeNB 100-1 and the PeNB 100-2 are included in E-UTRAN (Evolved-UMTS Terrestrial Radio Access Network) as a radio access network of LTE. In the embodiment, E-UTRAN is configured as a heterogeneous network, and the PeNB 100-2 is installed in a coverage area of the MeNB 100-1 and more specifically in a high traffic zone (so-called hot zone) for example.

The MeNB 100-1 can provide services using two different carriers (CC1 and CC2). The services may be provided through three or more carriers. Each carrier includes a plurality of resource blocks (RB) in a frequency direction. The PeNB 100-2 is operated using a single carrier (CC1) and uses the CC1 for radio communications with the PUE 200-2. If the MUE 200-1 using the CC1 for the radio communications with the MeNB 100-1 is installed around the boundary of the coverage area of the PeNB 100-2, the PeNB 100-2 may receive uplink interference from the MUE 200-1.

The coverage area is formed by one or a plurality of cells. The cell is identified with a cell ID and is associated with a carrier. A carrier, the eNB 100 using the carrier, and a coverage area of the eNB 100 may be collectively referred to as a cell. Thus, the MeNB 100-1 may be referred to as a macrocell and the PeNB 100-2 may be referred to as a picocell.

When a carrier aggregation technique is supported, a first carrier to be used for radio communications between the MeNB 100-1 and the MUE 200-1 is referred to as a primary carrier, and carriers added thereafter are referred to as secondary carriers. The primary carrier may be referred to as a primary cell (Pcell) and the secondary carrier may be referred to as a secondary cell (Scell).

Under a connected (RRC connected) state as a connected state, the UE 200 can switch a connecting cell (referred to as serving cell). Such a switching of the serving cell is achieved by handover for example. Handover of the UE 200 is controlled by the serving cell of the UE 200.

An X2 interface as a logical communication path for connecting between adjacent base stations is established between the MeNB 100-1 and the PeNB 100-2. An S1 interface as a logical communication path for EPC (Evolved Packet Core) as a core network of LIE is established between EPC and the MeNB 100-1 and between EPC and the PeNB 100-2.

Figure 2:
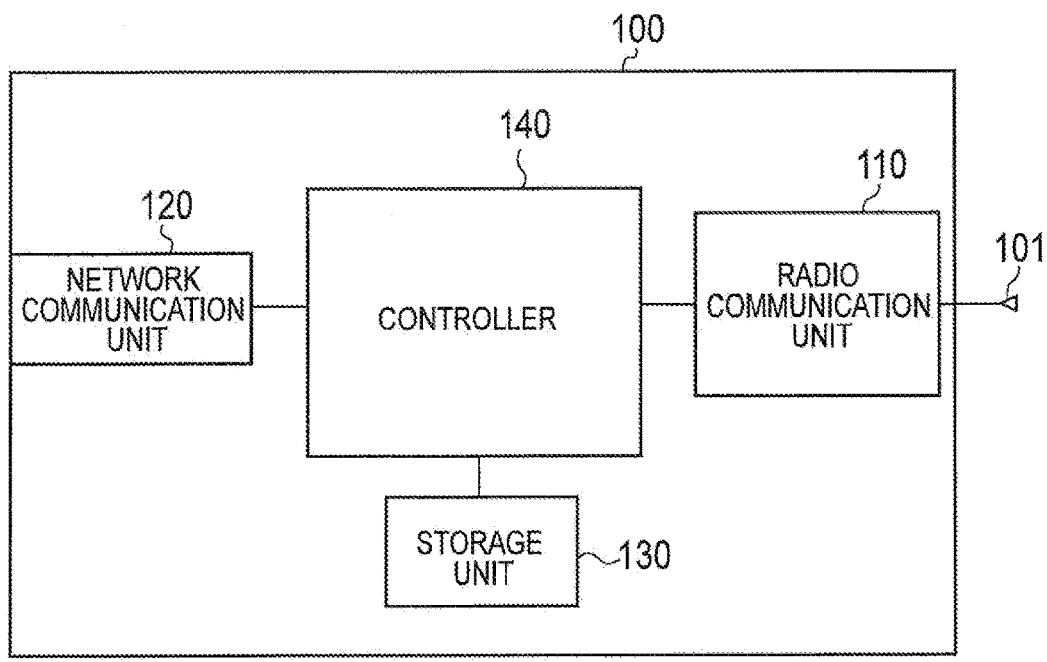
FIG. 2 is a block diagram of an eNB according to the first to the fourth embodiments.

Next, the configuration of the eNB 100 is described. FIG. 2 is a block diagram of the eNB 100. As shown in FIG. 2, the eNB 100 includes multiple antennas 101, a radio communication unit 110, a network communication unit 120, a storage unit 130, and a controller 140.

The antennas 101 are used for transmission and reception of a radio signal. The radio communication unit 110 is configured with a radio frequency (RF) circuit, a base band (BB) circuit, and the like for example, and transmits and receives a radio signal through the antennas 101. In the embodiment, the radio communication unit 110 can perform radio communications by simultaneously using a plurality of carriers. The network communication unit 120 performs inter-base station communications with an adjacent eNB on the X2 interface. The network communication unit 120 performs communications with EPC on the S1 interface. The storage unit 130 stores various types of information used for the control of the eNB 100 and the like. The controller 140 controls various functions of the eNB 100.

Figure 3:
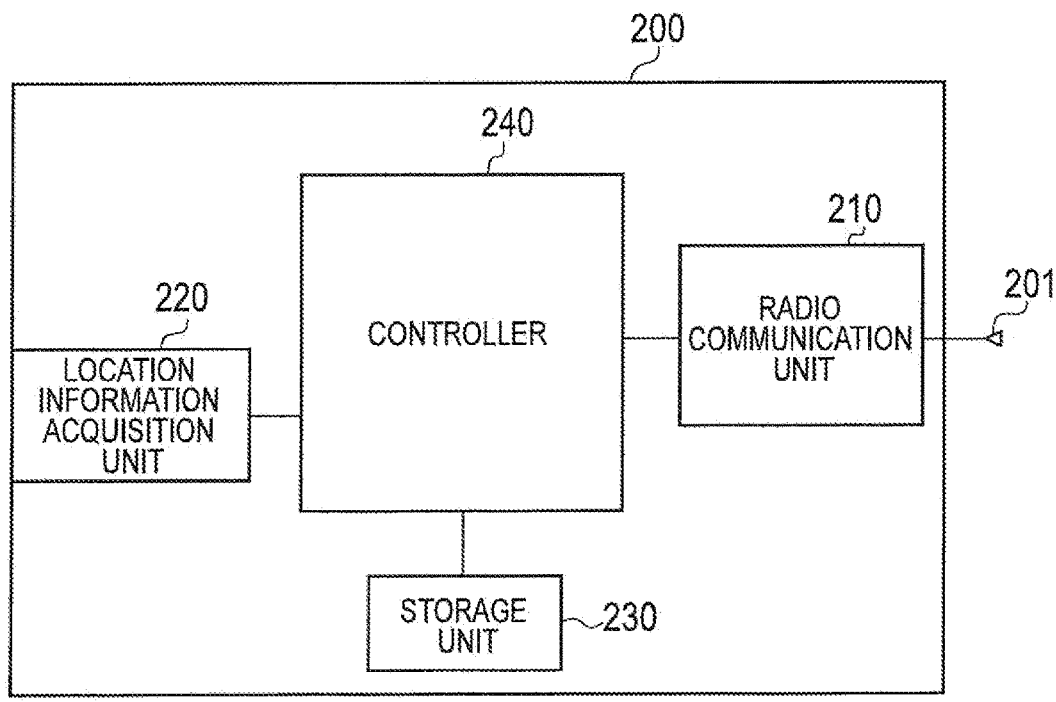
FIG. 3 is a block diagram of a UE according to the first to the fourth embodiments.

Next, the configuration of the UE 200 is described. FIG. 3 is a block diagram of the UE 200. As shown in FIG. 3, the UE 200 includes an antenna 201, a radio communication unit 210, a location information acquisition unit 220, a storage unit 230, and a controller 240.

The antenna 201 is used for the transmission and reception of a radio signal. The radio communication unit 210 is configured with an RF circuit, a BB circuit, and the like for example, and transmits and receives a radio signal through the antenna 201. In the embodiment, the radio communication unit 210 can perform radio communications by simultaneously using a plurality of carriers. The location information acquisition unit 220 includes a GPS receiver for example and outputs location information based on a received GPS signal to the controller 240. The storage unit 230 stores various types of information used for the control of the UE 200 and the like. The controller 240 controls various functions of the UE 200.

(Operation of Mobile Communication System)

Next, operation patterns 1 and 2 of the mobile communication system are described with a communication environment shown in FIG. 1 as an example.

In each of the operation patterns, it is assumed that the MeNB 100-1 stores in advance, geographical location information of each PeNB 100-2 installed in a coverage area of the MeNB 100-1, and information on a used carrier (operation carrier) of each PeNB 100-2.

(1) Operation Pattern 1

Figure 4:
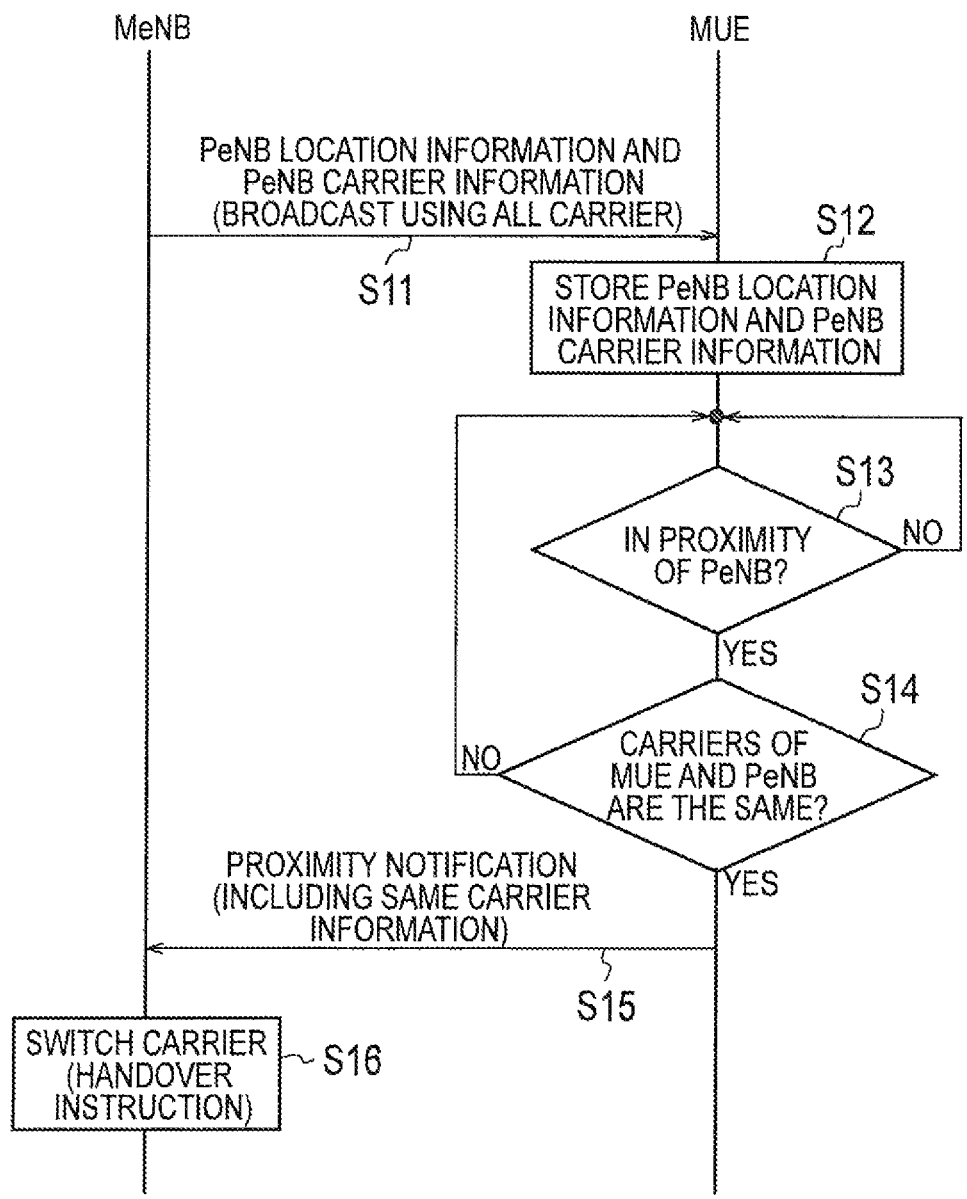
FIG. 4 shows an operation pattern 1 of the communication system according to the first embodiment.

FIG. 4 shows the operation pattern 1 of the embodiment. In this operation pattern, the carrier aggregation technique is not employed.

As shown in FIG. 4, in Step S11, the MeNB 100-1 transmits the location information indicting the geographical location of each PeNB 100-2 installed in the coverage area of the MeNB 100-1 and the carrier information indicating the used carrier of each PeNB 100-2. In the embodiment, the MeNB 100-1 broadcasts sets of location information and carrier information of all PeNBs 100-2 installed in the coverage area of the MeNB 100-1 by using each of the carriers (CC1 and CC2) usable by the MeNB 100-1. For example, the set of the location information and the carrier information is transmitted while being included in a system information block (SIB). The MUE 200-1 receives the SIB including the location information and the carrier information for each PeNB 100-2.

In Step S12, the MUE 200-1 acquires the location information and the carrier information for each PeNB 100-2 included in the SIB received in Step S11, and stores the location information and the carrier information. The MUE 200-1 holds the stored location information and carrier information as long as the MUE 200-1 is connected to the MeNB 100-1.

In Step S13, the MUE 200-1 acquires the location information of the MUE 200-1, and calculates the difference between the location of the MUE 200-1 indicated by the location information, and a location of each PeNB 100-2 indicated by the location information stored in Step S12. In other words, the MUE 200-1 calculates the distance between the MUE 200-1 and each PeNB 100-2. Then, the MUE 200-1 compares the distance calculated for each PeNB 100-2 with a threshold value. The threshold value is, for example, approximately the same with the radius of the coverage area of each PeNB 100-2, or is a value obtained by adding a predetermined value to the radius of the coverage area. The threshold value is stored in the MUE 200-1 in advance. Alternatively, the MeNB 100-1 may notify the MUE 200-1 of the threshold value. When the calculated distance is shorter than the threshold value, the MUE 200-1 determines that the MUE 200-1 is in the proximity of the PeNB 100-2, and the operation proceeds to Step S14.

In Step S14, the MUE 200-1 identifies the used carrier of the PeNB 100-2 determined to be in the proximity of the MUE 200-1 on the basis of the carrier information stored in Step S12, and determines whether the identified carrier and the used carrier (CC1) of the MUE 200-1 are the same. If the MUE 200-1 determines that the used carrier of the PeNB 100-2 is the same as the used carrier of the MUE 200-1, the operation proceeds to Step S15, and the operation returns to Step S13 if not.

When the PeNB 100-2 and the MUE 200-1 are in proximity to each other and the used carrier of the PeNB 100-2 and the used carrier of the MUE 200-1 are the same, the MUE 200-1 may act as a source of uplink interference to the PeNB 100-2.

In Step S15, the MUE 200-1 generates a proximity notification (Enhanced Proximity Indication) including carrier information indicating the carrier determined as the same in Step S14, and transmits the proximity notification to the MeNB 100-1. The MeNB 100-1 receives the proximity notification.

In Step S16, the MeNB 100-1 regards the MUE 200-1 as the source of uplink interference to the PeNB 100-2 on the basis of the proximity notification received in Step S15, and performs control so that the used carrier of the MUE 200-1 is switch to another carrier (CC2). More specifically, the MeNB 100-1 transmits to the MUE 200-1, a switching instruction (handover instruction) to a cell corresponding to the other cell.

(2) Operation Pattern 2

Figure 5:
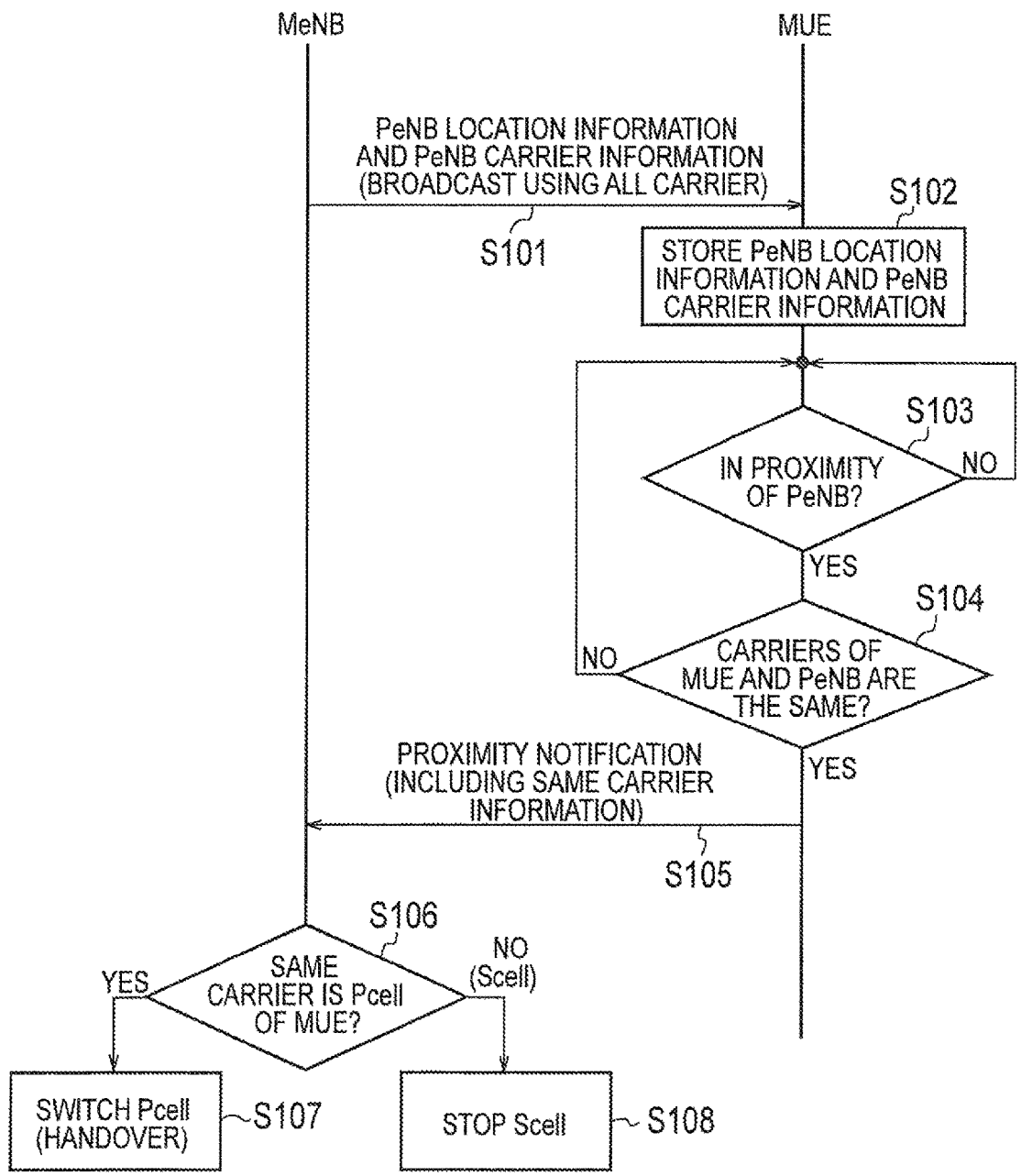
FIG. 5 shows an operation pattern 2 of the communication system according to the first embodiment.

FIG. 5 shows an operation pattern 2 of the embodiment. In this operation pattern, the carrier aggregation technique is employed. Thus, the primary carrier (Pcell) and the secondary carrier (Scell) can be used in radio communications between the MeNB 100-1 and the MUE 200-1.

As shown in FIG. 5, in Step S101, the MeNB 100-1 transmits the location information and the carrier information of each PeNB 100-2 installed in the coverage area of the MeNB 100-1 as in the operation pattern 1 of the embodiment. The MUE 200-1 receives the SIB including the location information and the carrier information of each PeNB 100-2 on the primary carrier (Pcell) of the MUE 200-1. This is because, it is defined in the specification that broadcasted system information is acquired only with the primary carrier (Pcell).

Step S102 and Step S103 are similar to those in the operation pattern 1 of the embodiment.

In Step S104, the MUE 200-1 identifies the used carrier of the PeNB 100-2 determined to be in proximity of the MUE 200-1 on the basis of the carrier information stored in Step S102. Then, the MUE 200-1 determines whether the identified carrier is the same as the primary carrier (Pcell) and/or the secondary carrier (Scell) used by the MUE 200-1. When the MUE 200-1 determines that the used carrier of the PeNB 100-2 is the same as the primary carrier (Pcell) and/or the secondary carrier (Scell) used by the MUE 200-1, the operation proceeds to Step S105, and the operation returns to Step S103 if it is determined otherwise.

In Step S105, the MUE 200-1 generates a proximity notification (Enhanced Proximity Indication) including carrier information indicating the same carrier determined in Step S104, and transmits the proximity information to the MeNB 100-1. The MUE 200-1 may include in the proximity notification, information indicating whether the same carrier is used as the primary carrier (Pcell) or the secondary carrier (Scell). The MeNB 100-1 receives the proximity notification.

In Step S106, the MeNB 100-1 determines whether the used carrier of the MUE 200-1 being the same as the used carrier of the PeNB 100-2 is the primary carrier (Pcell) or the secondary carrier (Scell) based on the carrier information included in the proximity notification received in Step S105 and carrier allocation information managed by the MeNB 100-1 or the information included in the proximity information. If it is determined to be the primary carrier (Pcell), the operation proceeds to Step S107, and if it is determined to be the secondary carrier (Scell), the operation proceeds to Step S108.

In Step S107, the MeNB 100-1 switches the primary carrier of the MUE 200-1 to another carrier (i.e., performs handover). The another carrier may be the secondary carrier (Scell) of the MUE 200-1. After switching the primary carrier (Pcell) to the another carrier, the MeNB 100-1 performs a setting to prevent the carrier used as the primary carrier before the switching from being added as the secondary carrier of the MUE 200-1.

Meanwhile, in Step S108, the MeNB 100-1 stops the use of the secondary carrier (Scell) of the MUE 200-1 that is the same as the used carrier of the PeNB 100-2.

(Summary)

As described above, in the mobile communication system including the MeNB 100-1 and at least one PeNB 100-2 having a smaller coverage area than the MeNB 100-1, the MeNB 100-1 transmits the location information indicating the location of the PeNB 100-2. After receiving the location information of the PeNB 100-2, the MUE 200-1 connected to the MeNB 100-1 transmits to the MeNB 100-1, the proximity notification (Enhanced Proximity Indication), which is information indicating that the MUE 200-1 is in proximity of the PeNB 100-2, and used for making the MUE 200-1 use a different carrier from the used carrier of the PeNB 100-2 in the proximity of the MUE 200-1. Thus, the uplink interference in the heterogeneous network can be prevented.

In the embodiment, the MeNB 100-1 transmits the location information of the PeNB 100-2 associated with the used carrier of the PeNB 100-2. Specifically, information indicating the used carrier of each PeNB 100-2 is broadcasted using each used carrier of the MeNB 100-1. Then, upon determining that the used carrier of the MUE 200-1 is the same as the used carrier of the PeNB 100-2 in the proximity of the MUE 200-1, the MUE 200-1 includes the carrier information indicating the same carrier in the proximity notification (Enhanced Proximity Indication) and transmits the information. Thus, the used carrier of the MUE 200-1 that is likely to give the uplink interference to the PeNB 100-2 can be identified.

In the embodiment, after receiving the proximity notification (Enhanced Proximity Indication), when the used carrier of the PeNB 100-2 in the proximity of the MUE 200-1 is same as the primary carrier (Pcell) of the MUE 200-1, the MeNB 100-1 performs handover control so that the primary carrier (Pcell) is switched to another carrier. Thus, the communications of the MUE 200-1 is not interrupted and the uplink interference to the PeNB 100-2 can be prevented.

In the embodiment, after switching the primary carrier (Pcell) to the other carrier, the MeNB 100-1 performs the setting to prevent the carrier used as the primary carrier (Pcell) before the switching from being added as the secondary carrier (Scell) of the MUE 200-1. Thus, the uplink interference to the PeNB 100-2 can be prevented.

In the embodiment, after receiving the proximity notification (Enhanced Proximity Indication), if the used carrier of the PeNB 100-2 is the same as the secondary carrier (Scell) of the MUE 200-1, the MeNB 100-1 performs a setting to stop the use of the secondary carrier (Scell). Thus, the uplink interference to the PeNB 100-2 can be prevented.

Second Embodiment

Now, a second embodiment is described by mainly focusing on the difference from the embodiment described above. In the embodiment, the MeNB 100-1 determines whether the used carrier of the PeNB 100-2 and the used carrier of the MUE 200-1 are the same.

(1) Operation Pattern 1

Figure 6:
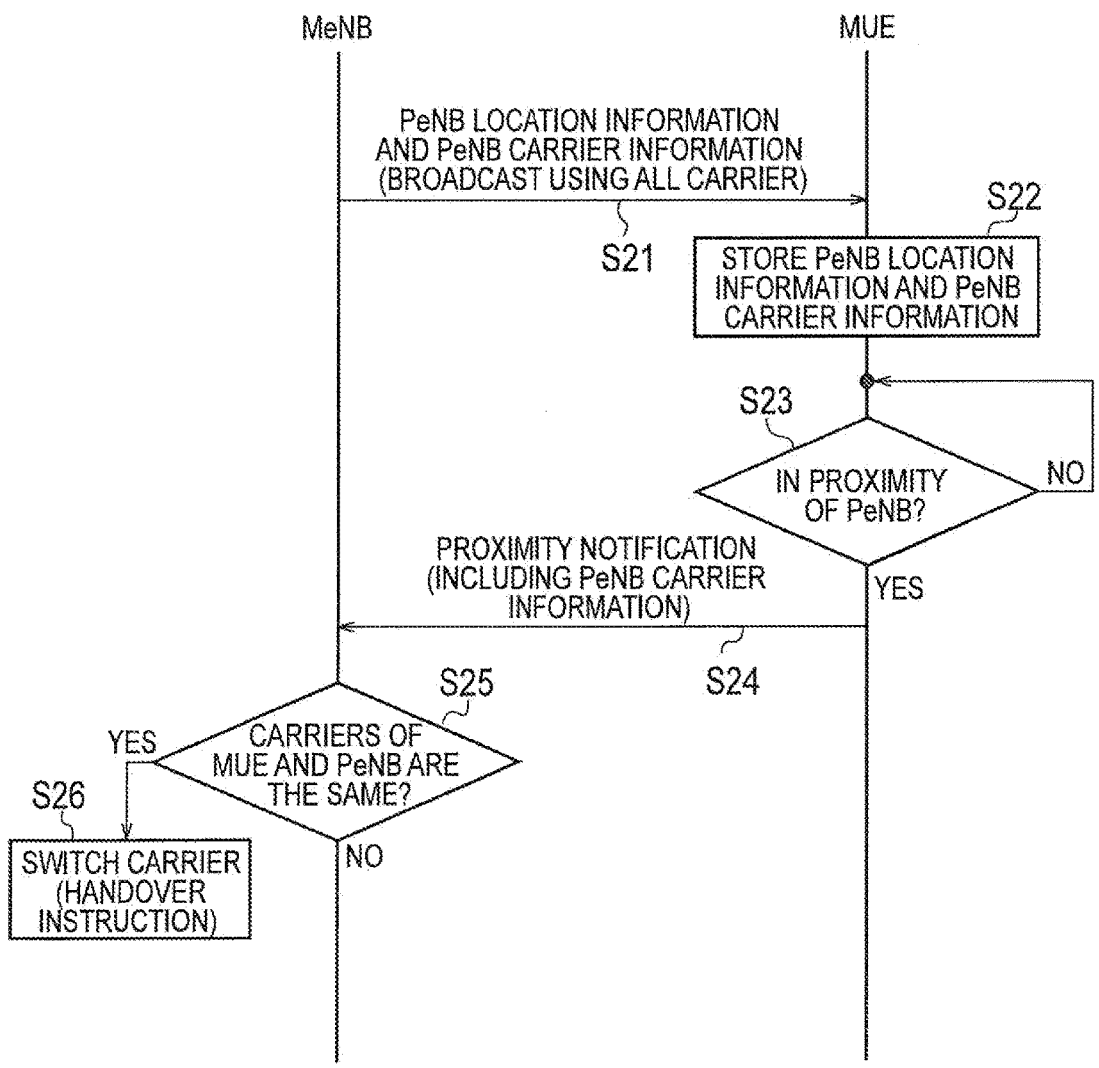
FIG. 6 shows an operation pattern 1 of the communication system according to the second embodiment.

FIG. 6 shows an operation pattern 1 of the embodiment. In this operation pattern, the carrier aggregation technique is not employed.

As shown in FIG. 6, Step S21 to Step S23 are similar to those in the operation pattern 1 of the first embodiment.

In Step S24, the MUE 200-1 generates a proximity notification (Enhanced Proximity Indication) including carrier information indicating the used carrier of the PeNB 100-2 determined to be in the proximity of the MUE 200-1 in Step S23, and transmits the proximity information to the MeNB 100-1.

In Step S25, the MeNB 100-1 determines whether the used carrier of the MUE 200-1 (CC1) is the same as the used carrier of the PeNB 100-2 in the proximity of the MUE 200-1. based on PeNB carrier information included in the proximity notification received in Step S24 and carrier allocation information for the MUE 200-1 managed by the MeNB 100-1. When the carrier is determined as the same, the operation proceeds to Step S26.

In Step S26, the MeNB 100-1 regards the MUE 200-1 as the source of uplink interference to the PeNB 100-2 and performs a control so that the used carrier of the MUE 200-1 is switched to another carrier (CC2). Specifically, the MeNB 100-1 transmits to the MUE 200-1, switching instruction (handover instruction) to the other cell.

(2) Operation Pattern 2

Figure 7:
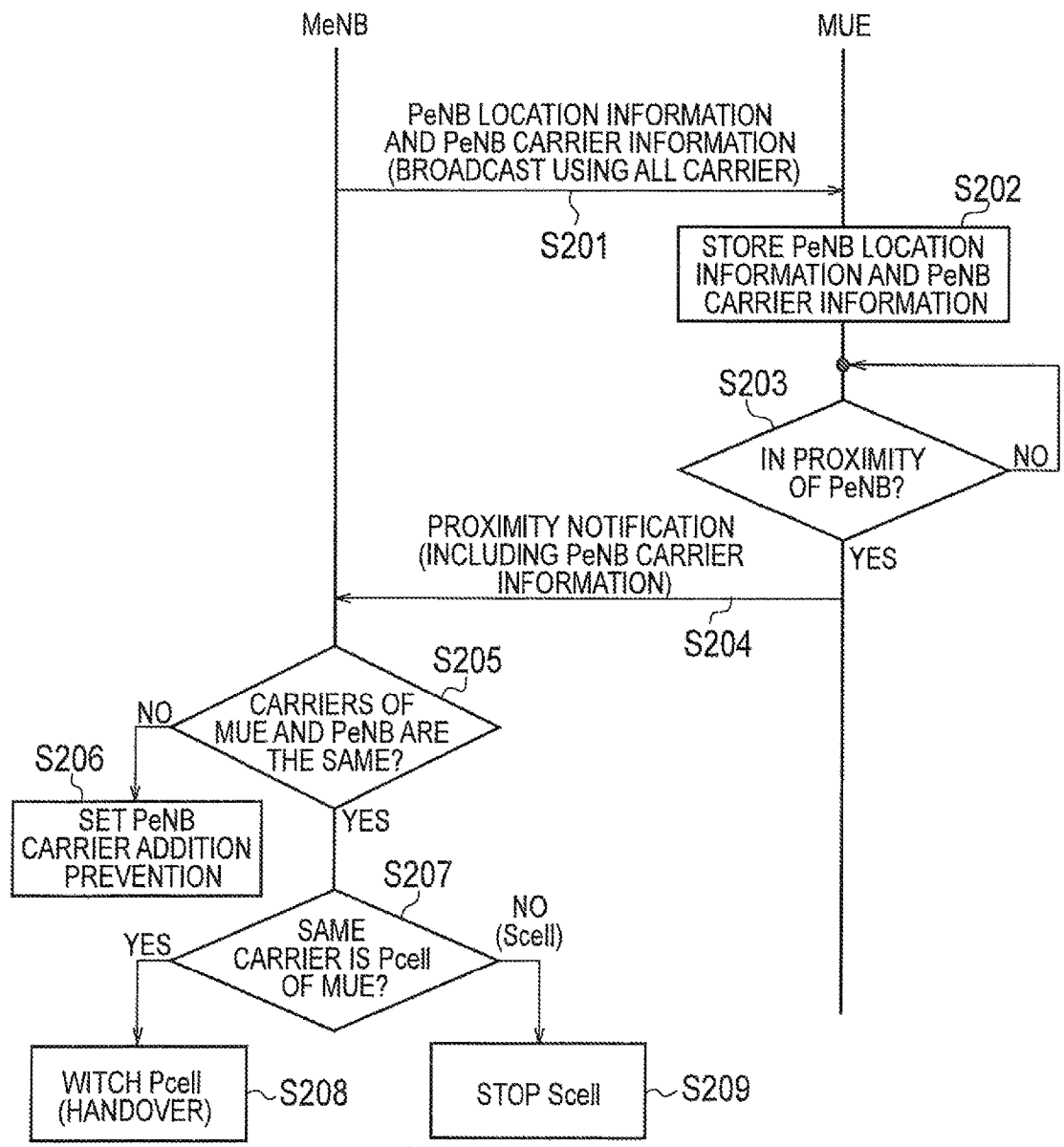
FIG. 7 shows an operation pattern 2 of the communication system according to the second embodiment.

FIG. 7 shows an operation pattern 2 of the embodiment. In this operation pattern, the carrier aggregation technique is employed.

As shown in FIG. 7, Step S201 to Step S204 are similar to those in the operation pattern 1 of this embodiment.

In Step S205, the MeNB 100-1 determines whether the used carrier of the PeNB 100-2 in the proximity of the MUE 200-1 is the same as the primary carrier (Pcell) and/or the secondary carrier (Scell) used by the MUE 200-1 based on the PeNB carrier information included in the proximity notification received in Step S204 and carrier allocation information for the MUE 200-1 managed by the MeNB 100-1. If the carrier is determine as the same, the operation proceeds to Step S207, and the operation proceeds to Step S206 if it determined otherwise.

In Step S206, the MeNB 100-1 performs a setting to prevent a carrier that is the same as the used carrier of the PeNB 100-2 in the proximity of the MUE 200-1 from being added as the secondary carrier of the MUE 200-1.

Step S207 to Step S209 are similar to those in the operation pattern 2 of the first embodiment.

Thus, in the embodiment, the carrier that is the same as the used carrier of the PeNB 100-2 in the proximity of the MUE 200-1 can be prevented from being added as the secondary carrier (Scell) of the MUE 200-1. Thus, the uplink interference to the PeNB 100-2 can be prevented.

Third Embodiment

Now, a third embodiment is described while mainly focusing on the differences from the embodiments described above.

In the embodiment, the MeNB 100-1 transmits through each used carrier of the MeNB 100-1, location information of the PeNB 100-2 using the same carrier as the used carrier. For example, if the carriers used by the MeNB 100-1 are CC1 and CC2, the location information of the PeNB 100-2 using the CC1 is transmitted using the CC1, and location information of the PeNB 100-2 using the CC2 is transmitted using the CC2. Thus, the MeNB 100-1 can transmit the location information of the PeNB 100-2 associated with the used carrier of the PeNB 100-2. Accordingly, the transmission of the information on the used carrier of the PeNB 100-2 can be omitted.

(1) Operation Pattern 1

Figure 8:
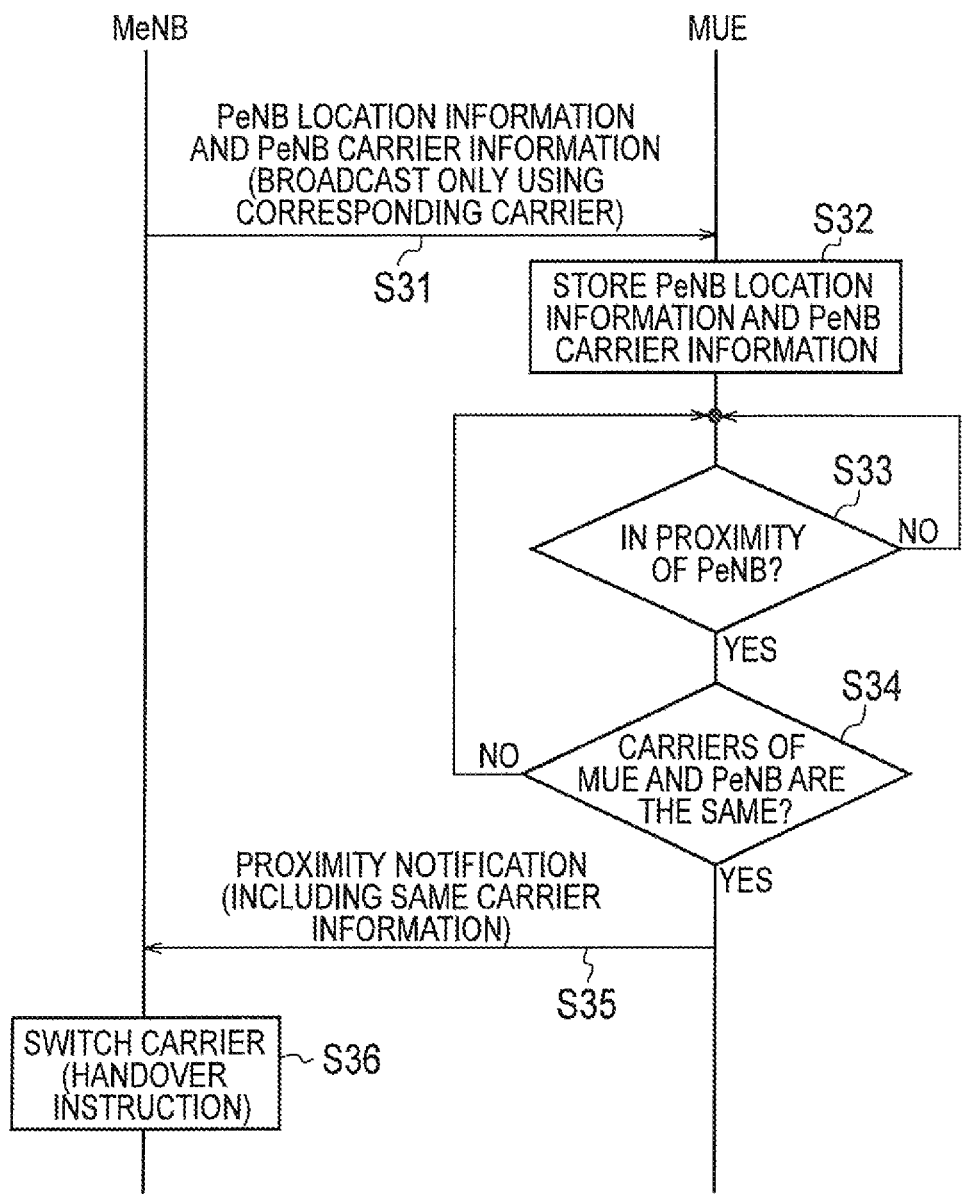
FIG. 8 shows an operation pattern 1 of the communication system according to the third embodiment.

FIG. 8 shows an operation pattern 1 of the embodiment. In the operation pattern, the carrier aggregation technique is not employed.

As shown in FIG. 8, in Step S31, the MeNB 100-1 broadcasts, using each carrier usable by the MeNB 100-1, the location information of the PeNB 100-2 using the carrier among the PeNBs 100-2 installed in the coverage area of the MeNB 100-1. For example, the location information is transmitted while being included in the system information block (SIB).

In Step S32, the MUE 200-1 acquires the location information of the PeNB 100-2 included in the SIB received in Step S101, and stores the location information and the carrier information indicating the carrier with which the location information is received. The MUE 200-1 holds the stored location information and the carrier information as long as the MUE 200-1 is connected to the MeNB 100-1.

Step S33 to Step S36 are similar to those in the operation pattern 1 of the first embodiment.

(2) Operation Pattern 2

Figure 9:
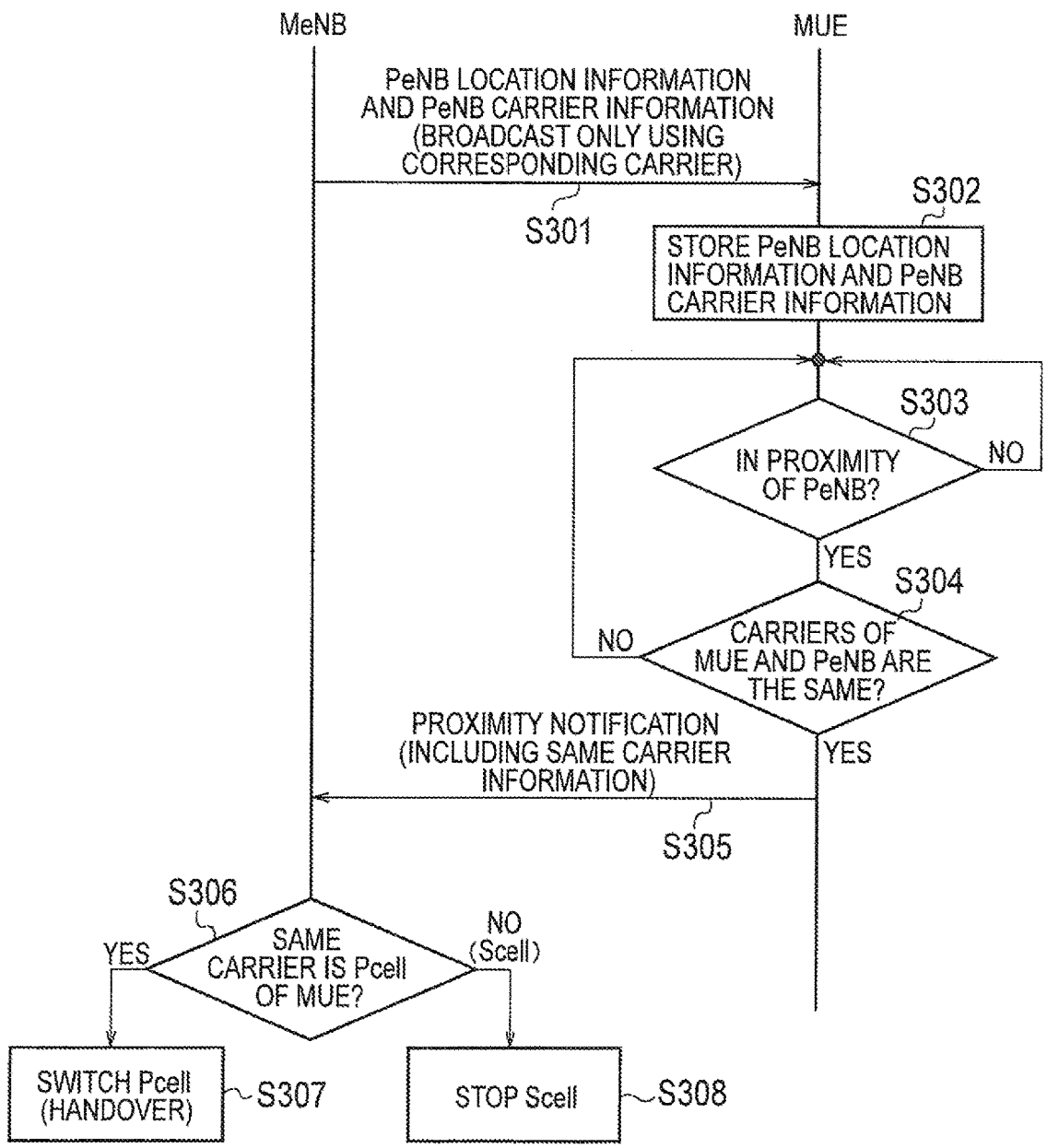
FIG. 9 shows an operation pattern 2 of the communication system according to the third embodiment.

FIG. 9 shows an operation pattern 2 of the embodiment. In the operation pattern, the carrier aggregation technique is employed.

As shown in FIG. 9, in Step S301, the MeNB 100-1 broadcasts, using each carrier usable by the MeNB 100-1, the location information of the PeNB 100-2 using the carrier among the PeNBs 100-2 installed in the coverage area of the MeNB 100-1. The MUE 200-1 receives the SIB including the location information of the PeNB 100-2 using the carrier on the primary carrier (Pcell) of the MUE 200-1.

When the secondary carrier (Scell) is added to the MUE 200-1, the MeNB 100-1 unicasts the location information of the PeNB 100-2 using the same carrier as the secondary carrier (Scell) to the MUE 200-1. For example, if the used carrier of the MUE 200-1 is the CC1 and the CC2 is added as the secondary carrier (Scell), the location information of the PeNB 100-2 using the CC2 is unicasted using the CC2. This is because, it is defined in the specification that the system information broadcasted is only acquired with the primary carrier (Pcell).

In Step S302, the MUE 200-1 acquires the location information of the PeNB 100-2 included in the SIB received in Step 301, and stores the location information and the carrier information indicating the carrier with which the location information is received. The MUE 200-1 holds the stored location information and the carrier information as long as the MUE 200-1 is connected to the MeNB 100-1.

Step S303 to Step S308 are similar to those in the operation pattern 2 of the first embodiment.

As described above, in the embodiment, the location information of the PeNB 100-2 can be transmitted while being associated with the used carrier of the PeNB 100-2. Thus, transmission of the used carrier information of the PeNB 100-2 can be omitted.

Fourth Embodiment

Now, a fourth embodiment is described while focusing on the differences from the embodiments described above.

(1) Operation Pattern 1

Figure 10:
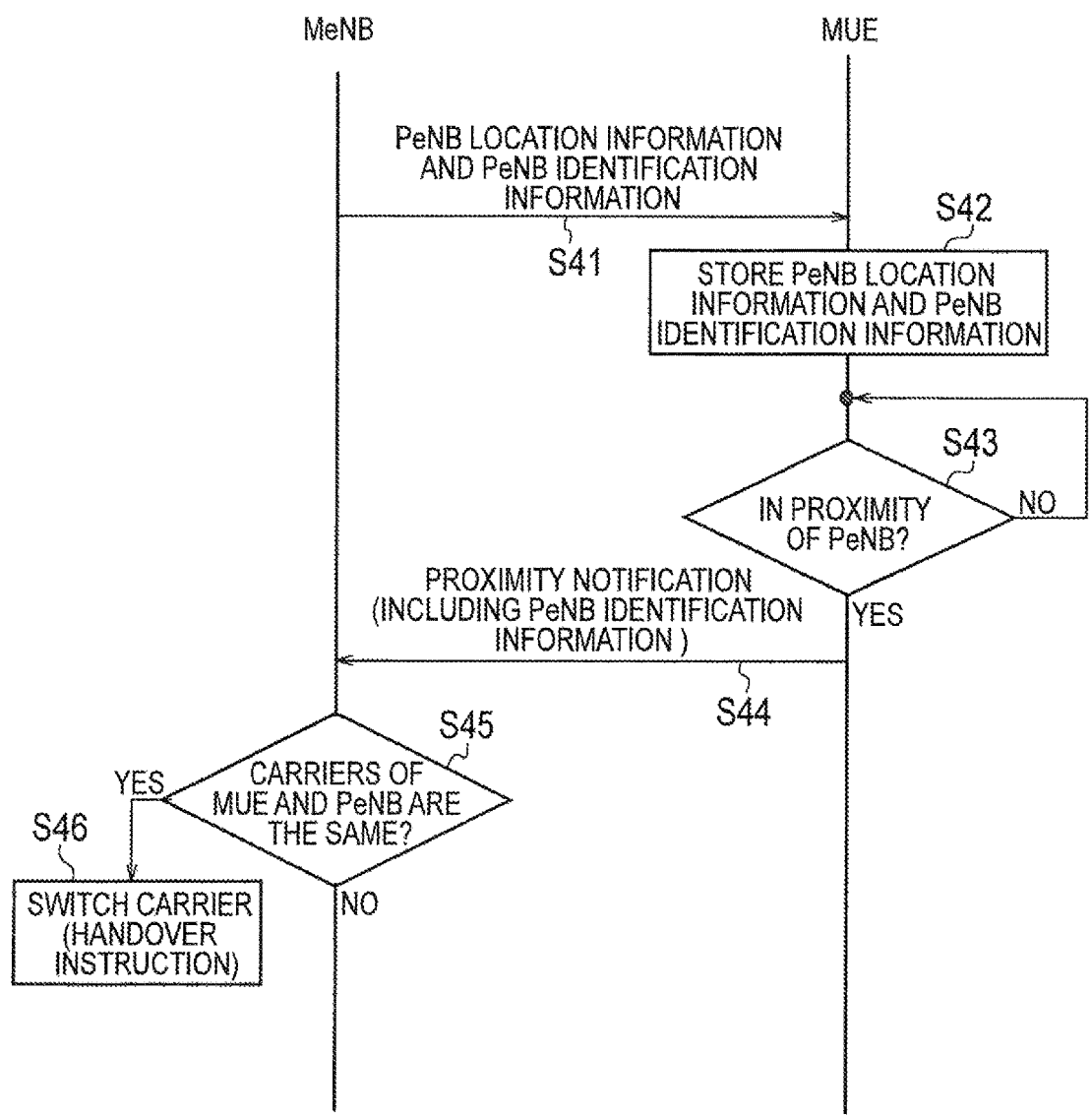
FIG. 10 shows an operation pattern 1 of the communication system according to the fourth embodiment.

FIG. 10 shows an operation pattern 1 of the embodiment. In this operation pattern, the carrier aggregation technique is not employed. As in the embodiments described above, the MeNB 100-1 stores in advance, information on a geographical location of each PeNB 100-2 installed in the coverage area of the MeNB 100-1 and information indicating the used carrier of each PeNB 100-2.

As shown in FIG. 10, in Step S41, the MeNB 100-1 transmits and identification information of and the location information indicting the geographical location of each PeNB 100-2 installed in the coverage area of the MeNB 100-1. For example, the MeNB 100-1 broadcasts sets of location information and identification information of all the PeNBs 100-2 installed in the coverage area of the MeNB 100-1 using all the carrier usable by the MeNB 100-1.

In Step S42, the MUE 200-1 acquires the location information and the identification information of each PeNB 100-2 included in the SIB received in Step S41, and stores the location information and the identification information. The MUE 200-1 holds the stored location information and identification information as long as the MUE 200-1 is connected to the MeNB 100-1.

In Step S43, if the MUE 200-1 determines that the MUE 200-1 is in the proximity of the PeNB 100-2 on the basis of the location information stored in Step S42, the operation proceeds to Step S44.

In Step S44, the MUE 200-1 generates a proximity notification (Enhanced Proximity Indication) including the identification information of the PeNB 100-2 determined to be in the proximity of the MUE 200-1, and transmits the proximity notification to the MeNB 100-1. The proximity notification also includes the identification information of the UE 200.

In Step S45, the MeNB 100-1 determines whether the used carrier of the MUE 200-1 is the same as the used carrier of the PeNB 100-2 (PeNB 100-2 indicated by the identification information) in the proximity of the MUE 200-1 based on the identification information of the PeNB 100-2 and the identification information of the UE 200 included in the proximity notification received in Step S44, the carrier allocation information for the MUE 200-1 managed by the MeNB 100-1, and information on the used carrier of each PeNB 100-2 managed by the MeNB 100-1. When the carrier is determined as the same, the operation proceeds to Step S46.

In Step S46, the MeNB 100-1 regards the MUE 200-1 as the source of uplink interference to the PeNB 100-2, and performs a control so that the used carrier of the MUE 200-1 is switched to another carrier (CC2). Specifically, the MeNB 100-1 transmits to the MUE 200-1, the switching instruction (handover instruction) to the cell corresponding to the other carrier.

(2) Operation Pattern 2

FIG. 11 shows an operation pattern 2 of the embodiment. In this operation pattern, the carrier aggregation technique is employed.

As shown in FIG. 11, Step S401 to Step S404 are similar to those in the operation pattern of the embodiment.

In Step S405, the MeNB 100-1 determines whether the used carrier of the PeNB 100-2 (i.e., the PeNB 100-2 indicated by the identification information) in the proximity of the MUE 200-1 is the same as the primary carrier (Pcell) and/or the secondary carrier (Scell) used by the MUE 200-1 based on the identification information of the PeNB 100-2 and the identification information of the UE 200 included in the proximity notification received in Step S404, the carrier allocation information for the MUE 200-1 managed by the MeNB 100-1, and information on the used carrier of each PeNB 100-2 managed by the MeNB 100-1. When the carrier is determined as the same, the operation proceeds to Step S407, and the operation proceeds to Step S406 if determined otherwise.

In Step S406, the MeNB 100-1 performs a setting to prevent the carrier that is the same as the carrier used by the PeNB 100-2 in the proximity of the MUE 200-1 from being added as the secondary carrier (Scell) of the MUE 200-1.

Step S407 to Step S409 are similar to those in the operation pattern 21 of the first embodiment.

Other Embodiment

It should not be understood that the description and drawings which constitute part of this disclosure limit the present invention. From this disclosure, various alternative embodiments, examples, and operation techniques will be easily found by those skilled in the art.

For example, the embodiments and modifications described above do not necessarily have to be independently implemented, but may be implemented in combination.

In the embodiments described above, the uplink interference to the PeNB 100-2 is prevented from occurring. Alternatively, the operation flows may be started after the uplink interference is detected. For example, the MeNB 100-1 receives Overload Indicator indicating the interference level of each uplink resource block on the X2 interface from the PeNB 100-2, and the operation flows start only when the Overload Indicator indicates the high level uplink interference.

The above embodiments are described for the assumed case where the MeNB 100-1 moves toward the PeNB 100-2. When the MeNB 100-1 moves away from the PeNB 100-2 thereafter, the MeNB 100-1 may be notified of such a movement. In this case, after transmitting the proximity notification, the MUE 200-1 monitors whether the proximate state (state where the distance is below the threshold value) is maintained. When the proximate state is no longer maintained, the MUE 200-1 sends the MeNB 100-1 a proximate release notification for notifying that it becomes unnecessary to make the used carrier of the MUE 200-1 different from the used carrier of the PeNB 100-2 that used to be in the proximity of the MUE 200-1. As a result, the MeNB 100-1 can restore the carrier to the original one from the switched primary carrier, and release the prevention of the carrier to be added as the secondary carrier (Scell).

In the embodiments described above, the number of the used carrier of the PeNB 100-2 is fixed to 1 (CC1). When the used carrier of the PeNB 100-2 is changed, the used carrier after the change can be notified from the PeNB 100-2 to the MeNB 100-1 on the X2 interface and the MeNB 100-1 may update the stored information.

In the embodiments described above, the description is given with the combination of the MeNB and the PeNB as an example. Alternatively, the combination of the MeNB and a femtocell (HeNB) and the combination of the PeNB and the femtocell (HeNB) may be employed.

The entire content of U.S. Provisional Application No. 61/555,259 (filed Nov. 3, 2011) is incorporated by reference.

INDUSTRIAL APPLICABILITY

As described above, the present invention is capable of preventing uplink interference in a heterogeneous network and therefore applicable in the field of wireless communication, such as mobile communication.

The invention claimed is:
1. A communication control method in a mobile communication system including a first base station and at least one second base station having a smaller coverage area than the first base station, comprising:
    a step A of transmitting location information indicating a location of the second base station from the first base station; and
    a step B of transmitting proximity notification information to the first base station from a user terminal connected to the first base station after the user terminal receives the location information, the proximity notification information indicating that the user terminal is in proximity of the second base station and being used for making the user terminal use a different carrier from a carrier used by the second base station, wherein
    in the step A, the first base station transmits the location information indicating the location of the second base station while associating the location information with the used carrier of the second base station, and the step A comprises a step of broadcasting, on each used carrier of the first base station, information indicating the used carrier of each second base station.

2. The communication control method according to claim 1, wherein, in the step B, when the used carrier of the second base station in the proximity of the user terminal is the same as the used carrier of the user terminal, the user terminal transmits the proximity notification information including information indicating the same carrier.

3. The communication control method according to claim 1 further comprising a step of, after the reception of the proximity notification information transmitted in the step B, performing handover control by the first base station such that the used carrier of the user terminal is switched to another carrier when the used carrier of the second base station in the proximity of the user terminal is the same as the used carrier of the user terminal.

4. The communication control method according to claim 1 further comprising a step of, after the reception of the proximity notification information transmitted in the step B, performing handover control by the first base station such that a primary carrier is switched to another carrier when the used carrier of the second base station in the proximity of the user terminal is the same as the primary carrier of the user terminal.

5. The communication control method according to claim 4 further comprising a step of, after the switching of the primary carrier to the another carrier, performing a setting by the first base station such that a carrier used as the primary carrier before the switching is prevented from being added as the secondary carrier of the user terminal.

6. The communication control method according to claim 1 further comprising a step of, after the reception of the proximity notification information transmitted in the step B, performing control by the first base station such that use of the secondary carrier is stopped when the used carrier of the second base station is the same as the secondary carrier of the user terminal.

7. A communication control method in a mobile communication system including a first base station and at least one second base station having a smaller coverage area than the first base station, comprising:
a step A of transmitting location information indicating a location of the second base station from the first base station; and
a step B of transmitting proximity notification information to the first base station from a user terminal connected to the first base station after the user terminal receives the location information, the proximity notification information indicating that the user terminal is in proximity of the second base station and being used for making the user terminal use a different carrier from a carrier used by the second base station, wherein
in the step A, the first base station transmits the location information indicating the location of the second base station while associating the location information with the used carrier of the second base station, and
the step A comprises a step of broadcasting, on each used carrier of the first base station, location information indicating the location of the second base station using the same carrier as the used carrier.

8. The communication control method according to claim 7, wherein, in the step A, when a secondary carrier is added to the user terminal, the first base station unicasts, to the user terminal, location information indicating the location of the second base station using the same carrier as the secondary carrier.

9. A base station in a mobile communication system, comprising:
a transmission circuitry configured to transmit location information indicating a location of another base station; and
a reception circuitry configured to receive proximity notification information from a user terminal connected to the base station, the proximity notification information indicating that the user terminal is in proximity of the another base station and being used for making the user terminal use a different carrier from a carrier used by the another base station in the proximity of the user terminal, wherein
the transmission circuitry is configured to transmit the location information indicating the location of the second base station while associating the location information with the used carrier of the second base station, and
the transmission circuitry is configured to broadcast, on each used carrier of the first base station, information indicating the used carrier of each second base station.

10. A user terminal in a mobile communication system, comprising:
a reception circuitry configured to receive, from a first base station, location information indicating a location of a second base station; and
a transmission circuitry configured to transmit proximity notification information to the first base station after the reception unit receives the location information, the proximity notification information indicating that the user terminal is in proximity of the second base station and being used for making the user terminal use a different carrier from a carrier used by the second base station in the proximity of the user terminal, wherein
the reception circuitry is configured to receive the location information indicating the location of the second base station while associating the location information with the used carrier of the second base station, wherein information indicating the used carrier of each second base station is broadcasted on each used carrier of the first base station.

11. A controller with a memory storing instructions to be executed by the controller, which is applicable to a user terminal in a mobile communication system, the controller configured to execute the instructions to perform:
a process for receiving from a first base station, location information indicating a location of a second base station; and
a process for transmitting proximity notification information to the first base station after the controller receiving the location information, the proximity notification information indicating that the user terminal is in proximity of the second base station and being used for making the user terminal use a different carrier from a carrier used by the second base station in the proximity of the user terminal, wherein
the controller is configured to receive the location information indicating the location of the second base station while associating the location information with the used carrier of the second base station, wherein information indicating the used carrier of each second base station is broadcasted on each used carrier of the first base station.

* * * * *